(No Model.)

N. WASHBURN.
METHOD OF AND APPARATUS FOR MANUFACTURING CAST IRON CAR WHEELS.

No. 467,214. Patented Jan. 19, 1892.

Witnesses: Henry Marsh, Howard F. Eaton

Inventor: Nathan Washburn, by Jas. H. Churchill, Atty

UNITED STATES PATENT OFFICE.

NATHAN WASHBURN, OF BOSTON, MASSACHUSETTS.

METHOD OF AND APPARATUS FOR MANUFACTURING CAST-IRON CAR-WHEELS.

SPECIFICATION forming part of Letters Patent No. 467,214, dated January 19, 1892.

Application filed July 17, 1891. Serial No. 399,824. (No model.)

*To all whom it may concern:*

Be it known that I, NATHAN WASHBURN, of Boston, county of Suffolk, and State of Massachusetts, have invented an Improvement in Methods of and Apparatus for Manufacturing Cast-Iron Car-Wheels, of which the following description, in connection with the accompanying drawings, is a specification, like letters on the drawings representing like parts.

This invention relates to a novel method of and apparatus for the manufacture of cast-iron car-wheels, and is an improvement upon the invention described in United States Patent No. 452,817, granted to me May 26, 1891. In the patent referred to I have described a process by which cast-iron car-wheels having a chilled tread are rendered stronger and more durable by rolling the chilled periphery while in a heated condition, whereby the laminated structure or appearance of the chilled portion of the wheel is destroyed.

My present invention has for its object to provide a novel method for manufacturing cast-iron car-wheels, whereby the laminated structure or appearance of the chilled portion of the wheel may be more completely changed and the metal rendered more compact and close, and the wheel thus made much stronger.

In accordance with my present invention the cast-iron in a molten state is poured into a mold having a chilling rim or circumference and provided with a tread-forming portion of a greater width than it is desired the tread of the finished wheel should have, so that the cast-iron wheel when first cast may have an abnormally wide tread. The cast-iron wheel, as soon as the metal has become "set" sufficiently to permit it to be handled, is taken from its mold and placed between dies, and the abnormally wide chilled tread of the wheel is subjected to substantially great pressure, acting transversely upon the tread only or in a direction substantially parallel to the axis of the wheel to upset the abnormally wide tread transversely—that is, to compress only the metal of the tread and reduce it to the desired or required width. The wheel thus treated may, and preferably will, then have its chilled periphery compressed, as described in the patent referred to.

The particular features of my invention will be pointed out in the claims at the end of this specification.

Figure 1:
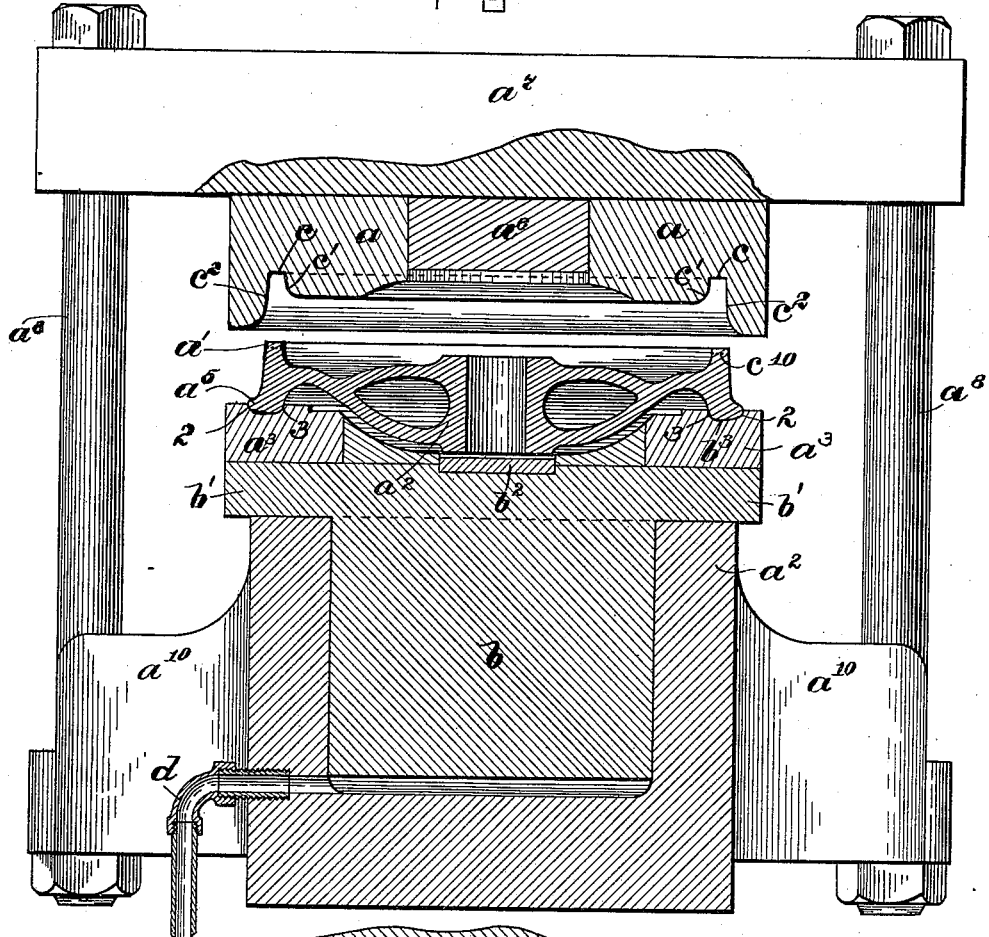
Figure 2:
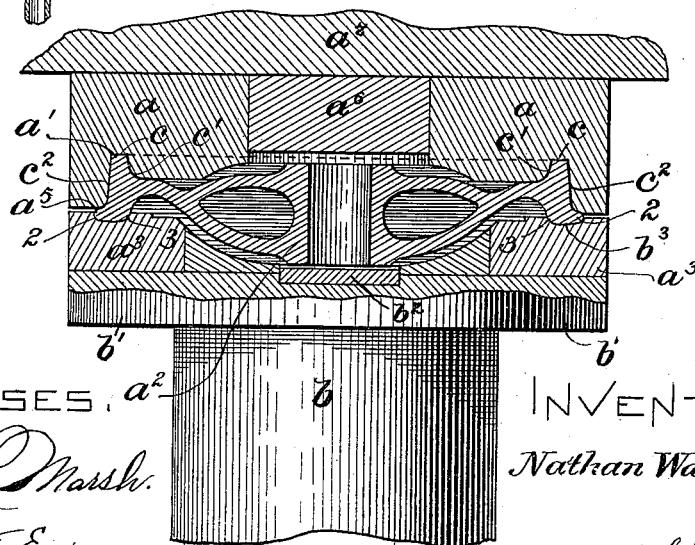

Figure 1 represents in elevation and section an apparatus with which to practice my improved method, the dies being open and in position to act on the tread of the wheel; and Fig. 2, a detail of the apparatus, showing the dies closed and the tread of the wheel compressed.

The apparatus with which to practice my improved method for treating the cast-iron car-wheels consists, essentially, as herein shown, of an upper die $a$, shaped to conform to the unflanged portion $a'$ of the tread of the cast-iron car-wheel $a^2$, and a lower die $a^3$, shaped to conform to the flanged portion $a^5$ of the said car-wheel. The upper die $a$ is preferably made as an annular ring fitted over a center block $a^6$, the said ring and center block being firmly secured in any suitable manner to the under side of a cross-beam $a^7$, supported upon columns $a^8$, secured in any desired manner at their lower ends to a suitable base or foundation, they being herein shown as extended through wings or arms $a^{10}$ on a cylinder $a^{12}$, which in practice may rest upon a solid foundation of any desired form and not herein shown. The cylinder $a^{12}$ contains within it a piston $b$, preferably provided at its upper end, as herein shown, with an enlarged head $b'$, upon which rests the lower die $a^3$, preferably made as an annular ring, which is fitted over a centering plate or block $b^2$, herein shown as fitted into a socket or recess in the piston-head. The lower die $a^3$ is provided on its upper face with an annular channel or groove $b^3$ of substantially the shape of the flange of the wheel and in which the flange of the wheel is placed, so that the said wheel rests upon its flanged side. The channel or groove $b^3$ is made of such depth that its side walls (represented by 2 3) embrace the flange and form confining-walls by which the metal of the flange is prevented from being displaced or flattened out when the tread of the wheel is compressed, as will be described.

The upper die $a$ is provided with an annular groove or channel $c$, having side walls $c'$ $c^3$ of unequal length to fit over the unflanged portion of the tread. The side walls $c'$ $c^2$ form confining-walls, by which the surplus metal of the unflanged portion of the tread is confined while the tread is being compressed and by means of which the metal under compression is forced or moved in a direction transverse of the periphery or in a direction substantially parallel to the axis of the wheel. The upper and lower dies are so shaped or made at their central portions—that is, within the tread-forming portions—that they do not compress the metal of the hub or web when the dies are brought together, as represented in Fig. 2, and consequently only the chilled portion or tread of the cast-iron wheel is compressed. The pressure necessary to compress the tread is preferably a hydraulic pressure, obtained by admitting fluid into the cylinder $a^{12}$ below the piston $b$ through a pipe $d$, connected to a suitable engine or source of supply. (Not herein shown.) In a cast-iron car-wheel made in the ordinary manner the chilled portion of the tread has a laminated structure or appearance, with the laminations of the metal extending in a radial line toward the center of the wheel.

The wheel when first cast is in accordance with my invention provided with a wider tread than is desired or necessary in the finished wheel, so as to furnish the necessary surplus of metal in the tread to obtain the desired amount of compression. The surplus metal is indicated in Fig. 1 by that portion above the dotted line $c^{10}$. When the piston $b$ is forced upward, the metal of the tread is compressed between the dies, and being confined between the side walls of the dies it is compacted and rendered close, and the grain or physical structure or appearance of the tread is completely changed, for it will be seen that the force or pressure exerted upon the metal is in a direction substantially at right angles to the laminations of the chilled portion, and the surplus metal in the tread is forced in a direction substantially at right angles to the laminations, and as a result the grain of the metal in the tread is completely changed.

By the method herein described all the metal comprising the tread is acted upon and danger of parts of the tread being unchanged is avoided. After the tread has been compressed as described and as represented in Fig. 2 the periphery, if necessary, may be further manipulated, as described in my patent referred to, or the said periphery may be trued up in any desired manner. The compression of the metal is steady or uniform and danger of fracture is thus avoided. It will be noticed that the flange of the wheel is laid in a groove or channel, and the side walls of the said groove form confining-walls, by means of which the flange of the wheel is prevented from being flattened out when the tread is compressed, and the form and thickness of the flange are maintained intact or in the original shape and size. Furthermore, it will be noticed that the tread only is compressed, as this is the only chilled portion of the cast-iron car-wheel.

I claim—

1. The herein-described method of treating cast-iron car-wheels, which consists in subjecting the chilled tread of the cast-iron wheel while in a heated state to a uniform pressure acting in a direction substantially parallel to the axis of the cast-iron wheel, substantially as described.

2. The herein-described method of treating cast-iron car-wheels, which consists in transversely compressing the chilled tread only of the cast-iron car-wheel and confining the metal of the chilled tread while under compression, substantially as described.

3. The herein-described method of treating cast-iron car-wheels, which consists in placing a flanged cast-iron car-wheel having a chilled tread upon a die with its flange side resting upon the said die and then compressing the chilled tread of the wheel in a direction substantially parallel to the axis of the wheel, substantially as described.

4. The herein-described method of manufacturing cast-iron car-wheels, which consists in casting the wheel with a chilled tread of greater width than the required width of the finished wheel, placing the car-wheel between dies with its flange confined, as described, and then compressing the chilled tread only of the wheel transversely or in a direction substantially at right angles to the laminations of the chilled portion, substantially as described.

5. In an apparatus for treating car-wheels, the combination, with a die having an annular channel or groove to receive the unflanged portion of the tread of the wheel, of a second die provided with an annular channel or groove to receive the flange of the wheel and in which the said flange is confined while the tread is being compressed, and means to impel one of the dies toward the other die, substantially as described.

6. In an apparatus for treating cast-iron car-wheels having a chilled tread, the combination, with a fixed die having an annular channel or groove to receive the unflanged portion of the chilled tread of the wheel, of a movable die provided with an annular channel or groove to receive the flange of the wheel and upon which die the said wheel rests with its flange confined within the said groove, a piston to act on the movable die, and a cylinder for said piston, substantially as described.

In testimony whereof I have signed my name to this specification in the presence of two subscribing witnesses.

NATHAN WASHBURN.

Witnesses:
 JAS. H. CHURCHILL,
 SADIE C. FEARING.